United States Patent [19]

Walsh

[11] 3,837,238

[45] Sept. 24, 1974

[54] COMBINED FOOT-REST AND SPEED CONTROL UNIT FOR VEHICLES

[76] Inventor: George Errington Walsh, 30 Kew Beach Ave., Toronto, Ontario, Canada

[22] Filed: May 18, 1970

[21] Appl. No.: 38,198

[52] U.S. Cl.................... 74/526, 74/564, 74/565
[51] Int. Cl............................................. G05g 1/14
[58] Field of Search ............ 74/526, 513, 564, 565; 123/98, 103 C, 103 E

[56] References Cited
UNITED STATES PATENTS

| | | | |
|---|---|---|---|
| 2,847,875 | 8/1958 | Drain | 74/564 X |
| 3,293,937 | 12/1966 | Gardner | 74/526 |

Primary Examiner—William F. O'Dea
Assistant Examiner—F. D. Shoemaker

[57] ABSTRACT

A combined foot-rest and speed control unit for vehicles comprises a pivotally mounted foot member locatable adjacent the vehicle's accelerator pedal. Linkage extending from engagement with the foot-rest connects with settable speed indicating means mounted remote from the foot-rest and in a location readily available to the driver. Restraining means are provided whereby the foot-rest position can be selectively adjusted relative to the vehicle such that by moving the accelerator pedal into planar relationship with the foot-rest the speed of the vehicle is adjusted to that speed indicated by the indicating means.

7 Claims, 8 Drawing Figures

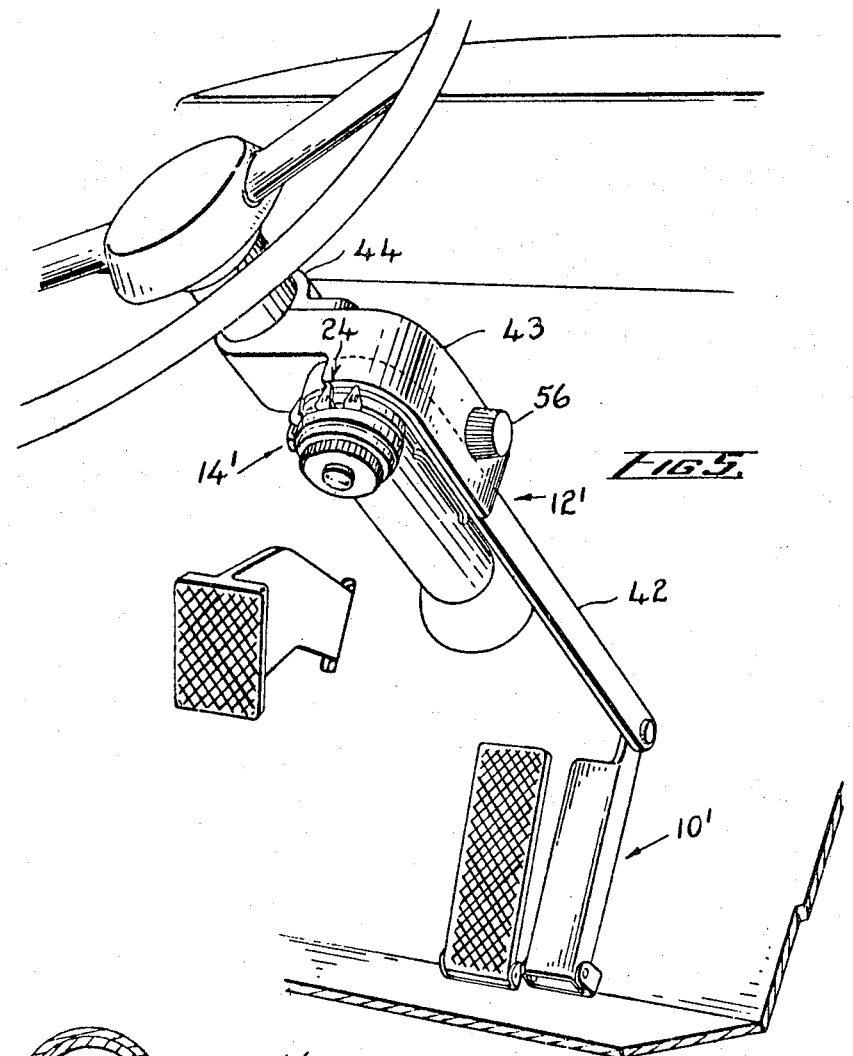
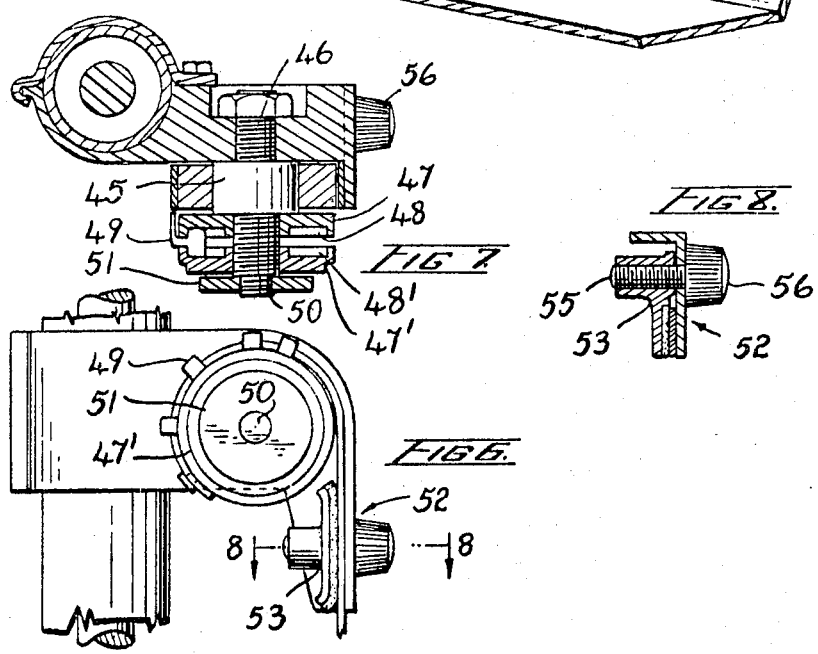

COMBINED FOOT-REST AND SPEED CONTROL UNIT FOR VEHICLES

This invention relates to a combined foot-rest and speed control unit, primarily for use in automobiles, trucks and the like wherein speed control is exercised by means of a foot-operated accelerator pedal forming a part of the usual carburetor or fuel injection throttle linkage.

Many attempts have been made to provide means whereby an operator could rest his foot while a substantially constant pressure is maintained on the accelerator pedal of a vehicle. However, all types known to the present inventor are connected in some fashion to linkages or other mechanical or electrical systems directly involved in the operation of a vehicle engine or brake system, etc.

In each case, the prior art control units require that a definite release movement be effected by an operator in order to release the speed control unit. In this way, use of the prior art units involves a definite loss of time before the operator can regain full control of his vehicle. Coupled with reaction times, the aforesaid loss of time to regain full control could mean the difference between life and death. This is not to mention the fact that any device calling for a precise and definite movement on the part of an operator under crisis conditions could very well lead to panic.

It is thus clear that, from the standpoint of safety as well as simplicity of operation, a combined foot-rest and speed control for vehicles must be completely physically disassociated from any and all engine and/or brake controls. Further, the unit must be such that, in emergency situations, an operator does not have to contend with any additional actions or controls.

For example, many units have been suggested of a type wherein, in order to disengage the control and release the accelerator pedal from a depressed position, it is necessary for the operator to apply a definite pressure to the brakes of the vehicle. In still further known units, a sideways movement of the foot is required to disengage the ratchet or catch means in order to return the accelerator to an idling position.

The present invention overcomes the prior art problems by provision of a unit which operates entirely independently of engine control linkages, brakes, etc., while permitting normal use of the accelerator and brake pedal at all times.

Further, the present invention incorporates indicating means whereby the unit may be selectively adjusted to a speed setting such that, without further reference to the speedometer, the operator is assured that he is travelling at a speed substantially constant and desired. This is of prime importance for travel in speed zones. Additionally, it is well known that an operator's sense of speed becomes distorted on long highway trips. Most people find that, on the open highway, it is a very frequent and natural occurance for one's foot, in becoming tired, to gradually increase on the accelerator pedal. The present invention precludes such a gradual increase.

A still further feature of the invention to be herein disclosed resides in provision of means whereby the foot-rest may be readily forced out of operative position by a completely normal foot operation at any time when the operator is required to accelerate rapidly. In other words, and as stated hereinabove, the present invention in no way affects the normal operation of the vehicle controls.

It is an object of the present invention to provide a combined foot-rest and speed control unit which is, at all times, physically remote from the usual controls for a vehicle's engine and brakes, etc.

A still further object of the present invention is the provision of a combined foot rest and speed control unit including indicating means whereby desired speed settings may be readily effected.

A still further object of the present invention is to provide, in a combined foot-rest and speed control unit, means whereby, by normal foot operation, an operator may render the unit inoperative without the necessity of additional control movements.

Further features and advantages of the present invention will become apparent from the following detailed description taken in conjunction with the appended drawings wherein:

FIG. 5 is a perspective partial view of the further embodiment of the present invention shown in operative position in an automobile;

FIG. 6 is a side view of the speed indicating means of FIG. 5;

FIG. 7 is a cross-sectional view taken along the lines 7—7 in FIG. 5; and

FIG. 8 is a cross-sectional view taken along the lines 8—8 of FIG. 6.

Referring particularly to FIGS. 1 to 4 inclusive, one embodiment of the present invention will now be described in detail.

Figure 1:
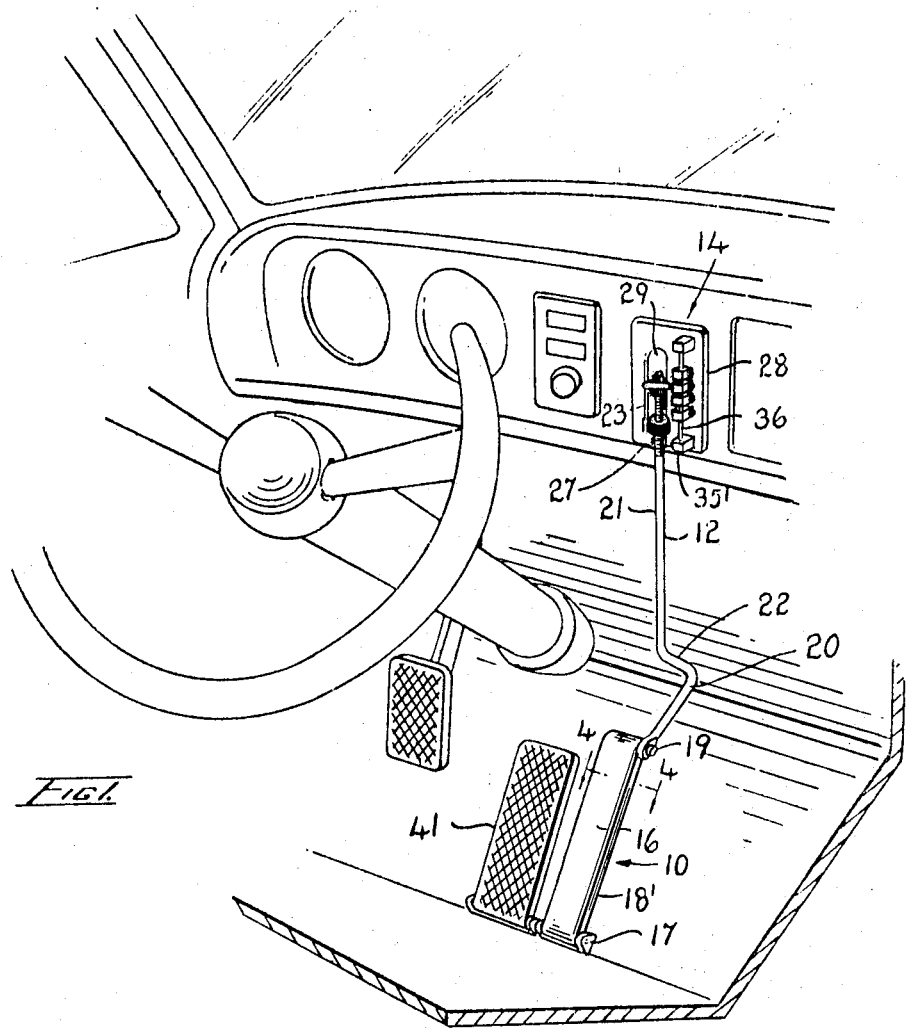
FIG. 1 is a perspective view of one embodiment of the present invention mounted in operative position in an automobile.

With specific reference to FIG. 1 it will be seen that the embodiment in question comprises the combination of a foot member generally indicated by the numeral 10, a linkage assembly generally indicated by the numeral 12 and a speed-setting indicating means generally indicated by the numeral 14.

Foot member 10 comprises an elongate body 16 pivotally mounted at one end thereof by any suitable pivoting means 17. The upper longitudinal edges 18, 18', of the body 16 are radiussed in order to permit an operator's foot to slide off the body 16 if desired.

The free end of foot member 10 includes a stub pivot 19 to which the lower end 20 of the linkage assembly 12 is pivotally connected.

The linkage assembly 12 comprises a link member 21 including a resilient off-set portion 22, the purpose of which will be hereinafter disclosed. The upper end 23 of linkage assembly 12 is threaded and carries an indicator or reference member 24. Reference member 24 is slidable on the upper end 23 and may be adjusted with respect thereto. Two lock nuts 25 and 26 cooperate to secure reference member 24 in a desired location. In addition to the foregoing, the linkage assembly 12 includes an actuating member 27 in the form of a circular nut, the outside surface of which is suitably knurled to facilitate the manipulation thereof.

Indicating means 14 comprises a panel member or indicia mounting means 28. Panel member 28 is recessed as at 29 and further includes a transverse slot 30 immediately above the bored boss 31. The upper end 23 of linkage assembly 12 passes through the boss 31 in sliding relationship therewith while actuating member 27 rests on the boss 31 in recess 30 and is prevented from upward movement by shoulder 32 of the slot 30.

Panel member 28 is secured to the vehicle (in this case, the instrument panel) by any suitable known means. As illustrated, the panel member is provided with integral pins 33 and 33' which pass through suitably bored holes in the vehicle for engagement with friction nuts 34 and 34'.

Figures 2, 3, 4:
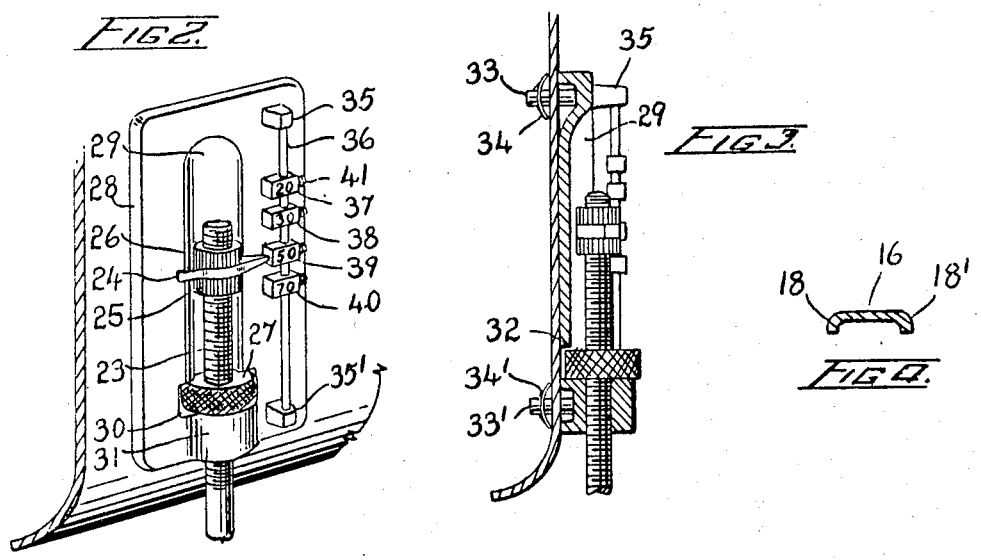
FIG. 2 is a partial perspective view of the speed indicating means of the embodiment set forth in FIG. 1.
FIG. 3 is a cross-sectional view taken along the lines 3—3 of FIG. 2.
FIG. 4 is a cross-sectional view of the foot member taken along the lines 4—4 of FIG. 1.

As best seen in FIGS. 2 and 3, panel member 28 is further provided, on the outer face thereof, with horizontally projecting lugs 35 and 35'. These last mentioned lugs carry a vertically extending rod 36 upon which are mounted speed indicating indicia 37, 38, 39 and 40. These indicia are provided with locking screws 41 such that they may be positioned as required on rod 36.

It should be noted that due to the adjustability of reference member 24 and the speed indicating indicia, the present embodiment may be calibrated for use in most vehicles regardless of accelerator pedal stroke. Thus, despite the inherent simplicity of the present embodiment, it will be appreciated that such embodiment is "universal" in its application.

In operation, having mounted the unit in a vehicle, the first step is to ensure that the reference member 24 and the speed indicating indicia 37 through 40 are properly aligned. This procedure is simple in the extreme and may be carried out at any service station equipped with a dynamometer. After calibration, rotation of the actuating member 27 raises or lowers the upper end of linkage assembly 12 until reference member 24 registers adjacent the desired indicia. Naturally, movement of the linkage assembly 12 effects a pivotal movement of foot member 10 such that when the accelerator pedal 41 of the car or vehicle is depressed into substantially planar relationship with foot member 10, the operator is assured that his vehicle will be moving at substantially the desired speed. The operator's foot will be resting partially on foot member 10 and partially on accelerator pedal 41. While linkage assembly 12 is slightly resilient, the operator may vary foot pressure to a satisfactory degree to relieve stress without varying the position of accelerator pedal 41. Should it become necessary for the operator to accelerate rapidly at any given instant, for example, to avoid an accident, it is not necessary for the foot to be removed from foot member 10 since the inherent resilience of linkage assembly 12 together with the off-set portion 22 permit depression of foot member 10 without further adjustment of actuating member 27 being necessary. When the necessity for rapid acceleration has passed, the foot member 10 will return to its set position.

Turning to FIGS. 5 through 8, a further embodiment of the same invention is set forth. The second embodiment includes the same basic combination of a foot member 10', a linkage assembly 12', and indicating means 14'.

In the case of the second embodiment however, (see FIG. 5) the linkage assembly 12' includes a, flexible strap member 42 pivotally connected at its lower end to foot member 10' and having, at the upper end thereof, a housing 43 integrally connected to clamping means 44 whereby the upper portion of the unit may be adjustably clamped to a steering wheel column.

As best seen in FIGS. 6 and 7, strap member 42 passes over and partially around a shoulder portion 45 of a threaded shaft 46 rotatably mounted in housing 43. Threadably mounted on the outer end of shaft 46 is a pair of indicia clamping discs 47 and 47'. These clamping discs 47 and 47' are formed on the inner surfaces thereof with complementary annular recesses 48 and 48'.

Disc 47 is threaded onto shaft 46 and is substantially locked against the shoulder portion 45. A desired plurality of indicia 49 having opposed protruding portions at the base thereof are locked between the clamping discs by insertion of the protruding portions in the annular grooves 48 and 48'. Disc 47' is, of course, threaded into locking engagement with the indicia 49 and disc 47. In order to facilitate installation, initial alignment and/or re-positioning of the indicia between the discs, either the indicia or the discs may be magnetized.

The outermost end of shaft 46 is reduced in diameter and threaded as at 50 and a retaining nut 51 is threadably attached thereto. It will be seen that provision is made to preclude longitudinal displacement of disc 47 and 47' with respect to shaft 46 such that rotation of the discs will effect rotation of the shaft to bring the desired indicia in registry with a reference indicator 24'. Obviously, rotation of shaft 46 also effects raising or lowering of the strap member 42 with attendant pivoting of foot member 10'.

In order to provide for variation of foot pressure without disturbing the setting of the control unit, a friction device generally indicated by the numeral 52 is incorporated in the housing 43. With particular reference to FIG. 8, the said friction device is seen to constitute a backing plate 53 to which is attached a friction pad 54. This friction pad may be of a zinc-asbestos combination such as is used in brake linings. A threaded stub 55 having an integral knob 56 passes through housing 43 into threadable engagement with backing plate 53. Strap member 42, passing between housing 43 and the friction pad 54 may thus be subjected to a frictional force insufficient to lock the member 42 but sufficient to preclude movement of the strap in response to normal variation in foot pressure.

The second embodiment is subject to the same preliminary calibration operation and, in use, functions in substantially the same manner as the first embodiment described hereinabove. The operator rotates the discs, (and therefore the indicia and strap member) to locate the desired indicia with respect to the reference indicator 24'. Such movement brings the foot member into the desired inclination on and depression of the accelerator pedal into planar relationship with the foot member ensures that the vehicle will move at the desired speed. Again, the foot member acts as a rest for the operator's foot but will not prevent rapid acceleration upon the application of abnormal foot pressure.

In embodiments similar to that illustrated in FIGS. 5 through 8, it will be apparent that the friction device 52 must be set to permit manual selection of the desired "speed-setting" such that undue pressure of the foot on foot member 10', working through the mechanical advantage inherent in the linkage, may disturb the initial or desired setting. To substantially avoid such unwanted shifting; compression-spring elements or the like can be located between the lower face of the foot member 10' and the vehicle floor.

In practice, of course, it is found that, even with the foot in a restful attitude, the pressure applied on an accelerator pedal seldom increases beyond a limit which can be readily accommodated by the friction device 52 alone.

It should further be noted that while the embodiments illustrated herein relate to vehicles having rear-pivoted accelerator pedals, the present invention, merely by application of expected skill, can be modified to co-operate with pendant-type accelerator pedals.

The present disclosure and the drawings associated therewith are purely exemplary and, to those skilled in this art, other changes and modifications will become obvious without departing from the spirit and scope of the actual invention.

The embodiments of the invention in which an exclusive property or privilege is claimed are defined as follows:

1. A combined foot-rest and speed control unit for vehicles having a foot-operated accelerator pedal, consisting essentially in the combination of:
   a. a foot member pivotally mounted at one end thereof on the vehicle adjacent but out of contact with the accelerator pedal;
   b. adjustable speed-setting indicating means mounted in the vehicle remote from said foot member,
   c. linkage means interconnecting the indicating means and the end of the foot member remote from said one end; and
   d. means operable to restrain movement of the foot member relative to the vehicle whereby the position of the foot member relative to the vehicle can be selectively adjusted to effect indication of a desired speed-setting, depression of the vehicle's accelerator pedal into planar relationship with said foot member adjusting the speed of the vehicle to the speed indicated by the indicating means.

2. A combined foot-rest and speed-control unit for vehicles having a foot-operated accelerator pedal, consisting essentially in the combination of:
   a. a foot member pivotally mounted at one end thereof on the vehicle adjacent but out of contact with the accelerator pedal;
   b. indicia mounting means detachably mountable in the vehicle remote from the foot member;
   c. adjustably mounted indicia on said mounting means;
   d. a linkage assembly pivotally connected at one end thereof to the free end of said foot member and extending to said mounting means for adjustable connection therewith;
   e. reference means on said linkage assembly;
   f. means to selectively control movement of the linkage in relation to said indicia; and
   g. means operable to restrain movement of the foot member relative to the vehicle, movement of the control means effecting positioning of the foot member such that by resting one's foot partially on the foot member and partially on the accelerator pedal, the latter is controlled, with one's foot at rest, for a desired and indicated vehicle speed.

3. A combined foot-rest and speed-control unit as defined in claim 2 wherein said indicia mounting means comprises a support member having a bore therein, the end of the linkage means remote from said one end extending through said bore in rotatable registration therewith; rotatable means mounted adjacent said bore and engaging said linkage to move the latter with respect to the mounting means.

4. A combined foot-rest and speed-control unit as defined in claim 3 wherein said reference means is adjustably mounted on said remote end of the linkage adjacent said indicia.

5. A combined foot-rest and speed-control unit as defined in claim 2 wherein the foot member restraining means is provided by forming said linkage means with an offset, resiliently connected extension portion whereby said linkage will temporarily extend when excess pressure is applied to the foot member without disturbing the speed-setting indication.

6. A combined foot-rest and speed-control unit as defined in claim 2 wherein said indicia mounting means comprises a housing including means to clamp the housing to the vehicle; a shaft rotatably mounted in cantilever fashion in said housing, said linkage means being connected to said shaft and adapted to wrap there-around upon rotation of the shaft; said indicia being adjustably locked in said shaft for selection registration with reference means on said housing.

7. A combined foot-rest and speed-control unit as defined in claim 6 wherein the foot member restraining means comprises a manually operable friction clamp connected to said housing.

* * * * *